United States Patent
Lee et al.

(10) Patent No.: US 9,489,686 B2
(45) Date of Patent: Nov. 8, 2016

(54) SYSTEM AND METHOD BASED ON USE INFORMATION OBTAINED FROM A USER TERMINAL

(75) Inventors: Haejin Lee, Seongnam-si (KR); JungHo Shin, Seongnam-si (KR); Jungmin Lee, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 189 days.

(21) Appl. No.: 13/599,378

(22) Filed: Aug. 30, 2012

(65) Prior Publication Data

US 2013/0232183 A1     Sep. 5, 2013

(30) Foreign Application Priority Data

Aug. 31, 2011 (KR) .................... 10-2011-0087743

(51) Int. Cl.
    G06Q 30/02    (2012.01)
    H04L 29/08    (2006.01)
    G06Q 30/06    (2012.01)

(52) U.S. Cl.
    CPC ...... *G06Q 30/0282* (2013.01); *G06Q 30/0207* (2013.01); *G06Q 30/0209* (2013.01); *G06Q 30/0631* (2013.01); *H04L 67/10* (2013.01); *H04L 67/16* (2013.01)

(58) Field of Classification Search
    CPC ............ G06Q 30/0209; G06Q 30/0282; G06Q 30/0631; H04L 67/16
    USPC .............................................. 709/201
    See application file for complete search history.

(56) References Cited

U.S. PATENT DOCUMENTS

| | | | |
|---|---|---|---|
| 7,433,866 B2 * | 10/2008 | Berstis et al. | |
| 7,899,706 B1 * | 3/2011 | Stone et al. | 705/14.55 |
| 8,452,797 B1 * | 5/2013 | Paleja et al. | 707/767 |
| 8,578,275 B2 * | 11/2013 | Brolley et al. | 715/738 |
| 8,595,626 B2 * | 11/2013 | Brolley et al. | 715/738 |
| 8,712,841 B1 * | 4/2014 | Rajagopalan et al. | 705/14.16 |
| 2004/0254810 A1 | 12/2004 | Yamaga et al. | |
| 2008/0103900 A1 * | 5/2008 | Flake et al. | 705/14 |
| 2008/0250323 A1 * | 10/2008 | Huff | 715/733 |
| 2011/0320741 A1 * | 12/2011 | Tian | G06F 17/30991 711/147 |
| 2012/0054333 A1 * | 3/2012 | Vichare et al. | 709/224 |

(Continued)

FOREIGN PATENT DOCUMENTS

| | | |
|---|---|---|
| JP | 2003-058764 | 2/2003 |
| JP | 2004-355376 | 12/2004 |

(Continued)

OTHER PUBLICATIONS

Japanese Office Action mailed Jul. 16, 2013.

(Continued)

*Primary Examiner* — Aaron Strange

(74) *Attorney, Agent, or Firm* — IPUSA, PLLC

(57) ABSTRACT

Provided is a system and method based on use information of an application obtained from a user terminal. With respect to a communication terminal in which at least one first application and a second application including a function of collecting the use information associated with the first application are installed, in conjunction with the second application, a server for providing a collecting unit to collect the use information collected from a user with respect to the first application, and a recommended application list with respect to the first application based on statistics of the use information.

8 Claims, 6 Drawing Sheets

(56) References Cited

U.S. PATENT DOCUMENTS

| | | | |
|---|---|---|---|
| 2012/0072283 A1* | 3/2012 | DeVore et al. | 705/14.49 |
| 2012/0078727 A1* | 3/2012 | Lee | G06Q 30/02 705/14.66 |
| 2012/0316955 A1* | 12/2012 | Panguluri et al. | 705/14.41 |

FOREIGN PATENT DOCUMENTS

| | | |
|---|---|---|
| JP | 2011-090391 | 5/2011 |
| KR | 10-2009-0101770 | 9/2009 |
| KR | 10-0958699 | 5/2010 |
| KR | 1020110020178 | 3/2011 |

OTHER PUBLICATIONS

Korean office action dated Apr. 3, 2014.
Korean Office Action dated Jan. 27, 2015.
"Introduction of mobile application for analysis service of user behavior" (zdnet), Website, Oct. 15, 2010, <URL : http://www.zdnet.co.krinews/news_view.asp?artice_id=20101015145716&type=det>, with English abstract.
Japanese Office Action mailed Feb. 9, 2016.

* cited by examiner

SYSTEM AND METHOD BASED ON USE INFORMATION OBTAINED FROM A USER TERMINAL

CROSS-REFERENCE TO RELATED APPLICATION

This application claims priority from and the benefit of Korean Patent Application No. 10-2011-0087743, filed on Aug. 31, 2011, which is hereby incorporated by reference for all purposes as if fully set forth herein.

BACKGROUND OF THE INVENTION

1. Field of the Invention

Exemplary embodiments of the present invention relate to a service system and method for obtaining use information actually used by a user, from a user terminal application and providing various additional services based on the obtained application use information.

2. Discussion of the Background

An App Store, which refers to an Application Store, is a market place for on-line mobile contents, that is, software for mobile applications, for example, content application programs to be installed on a mobile phone such as a schedule manager, an address book, an alarm, a calculator, games, videos, an Internet connection, a music player, navigation software, Word, Excel, and the like, are readily available to be purchased and sold.

The App Store is an open market place where applications are developed and sold by individuals rather than being developed by a large enterprise and subsequently sold by telecommunication providers. Using programs such as a software development kit (SDK), Xcode, and the like, released by a management company, any developer may sell applications to smart phone users on a global basis. When an application created by an individual developer is registered in the App Store, consumers may connect to a wireless communication to select and download an application to a mobile phone, or to transfer the selected application to the mobile phone after downloading the application selected to a personal computer (PC).

Korean Patent Application No. 10-2011-0020178 (filed on Mar. 2, 2011) discloses a technology by which a user may download a desired application to a user terminal by providing a list of applications. However, a conventional art providing a downloading service of an application faces a limit in terms of providing a service of introducing an application, in that applications are only provided through being classified into each category.

Exemplary embodiments of the present invention are directed to suggesting a service model for recommending an application that is appropriate and customized for a user, based on application use information obtained from a user terminal.

The above information disclosed in this Background section is only for enhancement of understanding of the background of the invention and therefore it may contain information that does not form any part of the prior art nor what the prior art may suggest to a person of ordinary skill in the art

SUMMARY OF THE INVENTION

Exemplary embodiments of the present invention provide a system and method for obtaining use information actually used by a user with respect to an application installed in a user terminal and recommending an application that is appropriate and customized for a user, based on the use information obtained.

Exemplary embodiments of the present invention also provide a system and method for recommending an application that is appropriate and customized for a user, based on statistics of application use by peers.

Exemplary embodiments of the present invention also provide a system and method for encouraging more active service participation and consistent use of an application by providing points based on a range or category of providing user information or a number of downloading or executions of an application.

Additional features of the invention will be set forth in the description which follows, and in part will be apparent from the description, or may be learned by practice of the invention.

An exemplary embodiment of the present invention discloses a server including a collecting unit to collect, with respect to a communication terminal in which at least one first application and a second application including a function of collecting use information associated with the first application in conjunction with the second application are installed, use information collected from a user associated with the first application, and a providing unit to provide points to the user based on the collected use information.

Another exemplary embodiment of the present invention discloses a server including a collecting unit to collect, from a communication terminal in which at least one first application and a second application including a function of collecting use information associated with the first application in conjunction with the second application are installed, use information collected from a user associated with the first application, and a providing unit to provide a list of recommended applications based on statistics of the use information with respect to the first application.

The use information may include at least one of use information indicating that the first application is installed in the communication terminal for a predetermined period of time, use information indicating that the first application is executed in the communication terminal for a predetermined period of time, and use information indicating that the first application is recommended by the user for a predetermined period of time.

The list of recommended applications provided by the providing unit may include at least one of the first application that is installed by users installing the second application a greater number of times than a predetermined number of installations, the first application that is executed by users executing the second application a greater number of times than a predetermined number of executions, and the first application recommended by users recommending the second application a greater number of times than a predetermined number of recommendations.

The server may further include a setting unit to set an option of agreeing to provide information with respect to the collected use information and personal information including at least one of gender, location of residence, and age of the user according to a request of the user. Here, the collecting unit may selectively collect the use information and the personal information in which the option of agreeing to provide the information is set with respect to the communication terminal in which the second application is installed.

The server may further include a setting unit to set an option of agreeing to share information with other users with respect to the use information for the each first application installed in the communication terminal, according to a request of the user. Here, the collecting unit may collect the use information from the first application in which the option of agreeing to share the information with the other users is set.

The setting unit may set an option of agreeing to share the information with all users having a relationship with the user, or when the all users having a relationship with the user are divided into groups, set the option of agreeing to share the information with a specific group.

The list of recommended applications provided by the providing unit may include at least one of the first application that is installed by users setting an option of agreeing to share the information with the user a greater number of times than a predetermined number of installations, the first application that is executed by users setting an option of agreeing to share the information with the user a greater number of times than a predetermined number of executions, and the first application recommended by users setting an option of agreeing to share the information with the user a greater number of times than a predetermined number of recommendations.

The providing unit may provide the user with the use information in real time, when the use information collected from users setting an option of agreeing to share the information with the user.

An exemplary embodiment of the present invention discloses a communication terminal including one or more processors, a memory, and a plurality of programs, wherein the plurality of programs is configured to be stored in the memory and executed by the one or more processors, and includes at least one first application and a second application to collect use information associated with the first application. Here, the second application may include an information collecting code to collect at least one of use information indicating the first application that is installed in a user terminal for a predetermined period of time, use information indicating the first application that is executed in a user terminal for a predetermined period of time, and use information indicating the first application that is recommended by a user of a user terminal for a predetermined period of time, and an information transmitting code to transmit the use information to a host system associated with the second application. The use information is used in the host system as at least one of a criterion for providing points to the user, a criterion for determining a list of recommended applications with regard to the first application, and statistics information associated with the first application.

The second application may further include a setting code to set an option of agreeing to provide information with respect to the use information and personal information including at least one of gender, location of residence, and age according to a request of a user. Here, the information collecting code may selectively collect the use information and the personal information in which the option of agreeing to provide the information is set.

The points are provided based on the use information or a range of information in which the option of agreeing to provide the information is set.

A recommended App list may include at least one of the first application that is installed by users installing the second application a greater number of times than a predetermined number of installations, the first application that is executed by users executing the second application a greater number of times than a predetermined number of executions, and the first application that is recommended by users recommending the second application a greater number of times than a predetermined number of recommendations.

The second application may further include a setting code to set an option of agreeing to share information with other users with respect to the use information for the each first application according to a request of the user. Here, an information collecting code may collect the use information with respect to the first application for which the option of agreeing to share the information with the other users is set.

The setting code may set the option of agreeing to share the information with all users having a relationship with the user with respect to the use information, or when the all users having the relationship with the user are divided into groups, set the option of agreeing to share the information with a specific group with respect to the use information.

The list of recommended applications may include at least one of the first application that is installed by users setting an option of agreeing to share the use information with the user a greater number of times than a predetermined number of installations, the first application that is executed by users setting option of agreeing to share the use information with the users a greater number of times than a predetermined number of executions, and the first application that is recommended by users setting an option of agreeing to share the use information with the users a greater number of times than a predetermined number of recommendations.

In the host system, when the use information is collected from users setting an option of agreeing to share information with the user with respect to the use information, the use information is provided to the user in real time, and the second application may further include a receiving code to receive the use information collected from the users from the host system.

A method for controlling a server for providing an application to a communication terminal, wherein at least one first application and a second application including a function of collecting use information associated with the first application are installed in the communication terminal, may include collecting the use information collected from a user with respect to the first application that is installed in the communication terminal in conjunction with the second application, and providing points to a user based on the use information. Here, the use information may include at least one of use information indicating the first application that is installed in the communication terminal for a predetermined period of time, use information indicating the first application that is executed in the communication terminal for a predetermined period of time, and use information indicating the first application that is recommended by a user of the communication terminal for a predetermined period of time.

A method for controlling a server for providing an application, wherein at least one first application and a second application including a function of collecting use information associated with the first application are installed in the communication terminal, may include collecting the use information collected from a user with respect to the first application that is installed in the communication terminal in conjunction with the second application, and providing a recommended App list with respect to the first application based on statistics of the use information. Here, the use information may include at least one of use information indicating the first application that is installed in the communication terminal for a predetermined period of time, use information indicating the first application that is executed in the communication terminal for a predetermined period of time, and use information indicating the first application that is recommended by a user for a predetermined period of time.

A method for controlling a communication terminal, wherein at least one first application and a second application to collect use information associated with the first application are installed in the communication terminal, may include collecting at least one of use information indicating the first application that is installed in the communication terminal for a predetermined period of time, use information indicating the first application that is executed in the communication terminal for a predetermined period of time, and use information indicating the first application that is recommended by a user of the communication terminal, and transmitting the use information to a host system associated with the second application. Here, the use information may be utilized in the host system as at least one of a criterion for providing points to the user, a criterion for determining the recommended App list with respect to the first application, and statistics information associated with the first application.

An exemplary embodiment of the present invention discloses a communication terminal which includes at least one first application and a second application for collecting use information associated with the first application. The second application collects at least one of use information indicating the first application that is installed in the communication terminal for a predetermined period of time, use information indicating the first application that is executed in the communication terminal for a predetermined period of time, and use information indicating the first application that is recommended by a user of the communication terminal for a predetermined period of time. The second application also transmits the use information to a host system associated with the second application and receives points from the host system associated with the use information transmitted to the host system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
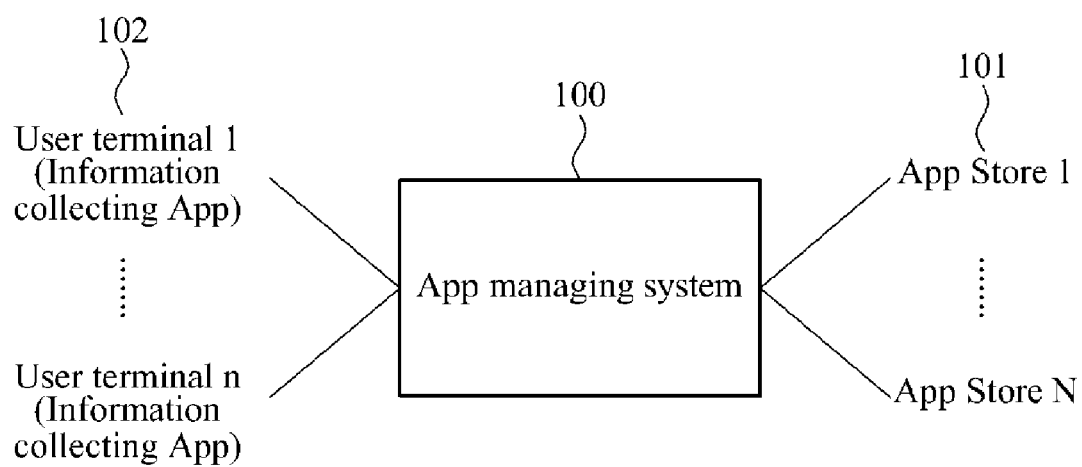
FIGS. 1 and 2 illustrate a service model for providing a recommended application based on statistics of use by users actually using an application according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Exemplary embodiments of a server system and a user terminal for providing a variety of additional services based on use information of an application actually used by users are described hereinafter.

As used herein, the term "application" may also be referred to as "App" and indicate any application that is installable in a communication terminal. Further, a user terminal may indicate any communication terminal such as a personal computer (PC), a tablet PC, a smart phone, a web TV, and the like that may have an App and establish a network connection to a server system. Here, the user terminal may include a touch sensing display as an example of a display device. A contact point between the touch sensing display and a user may correspond to one or more fingers of the user or a stylus pen.

FIG. 1 illustrates a service model for providing a recommended application based on statistics of use by users actually using an application with regard to an App on the Internet according to an exemplary embodiment of the present invention. Here, the App on the Internet may refer to any App registered in a plurality of App Stores 101 that functions as a platform for providing a downloading service of the App, with respect to a user terminal. The user may download and install a necessary App from the plurality of App Stores 101 to a plurality of user terminals 102 after connecting to the plurality of App Stores 101. Accordingly, an App managing system 100 that is a server system may analyze App data that the users actually download to the plurality of user terminals 102, and based on the analyzed App data provide a list of recommended applications, hereinafter referred to as 'recommended App list' among Apps of the plurality of App Stores 101. Here, the App managing system 100 may be configured to be in combination with the plurality of App Stores 101, that is, configured to include a platform for providing the downloading service of the App, or configured to be a separate system from the plurality of App Stores 101.

Figure 2:
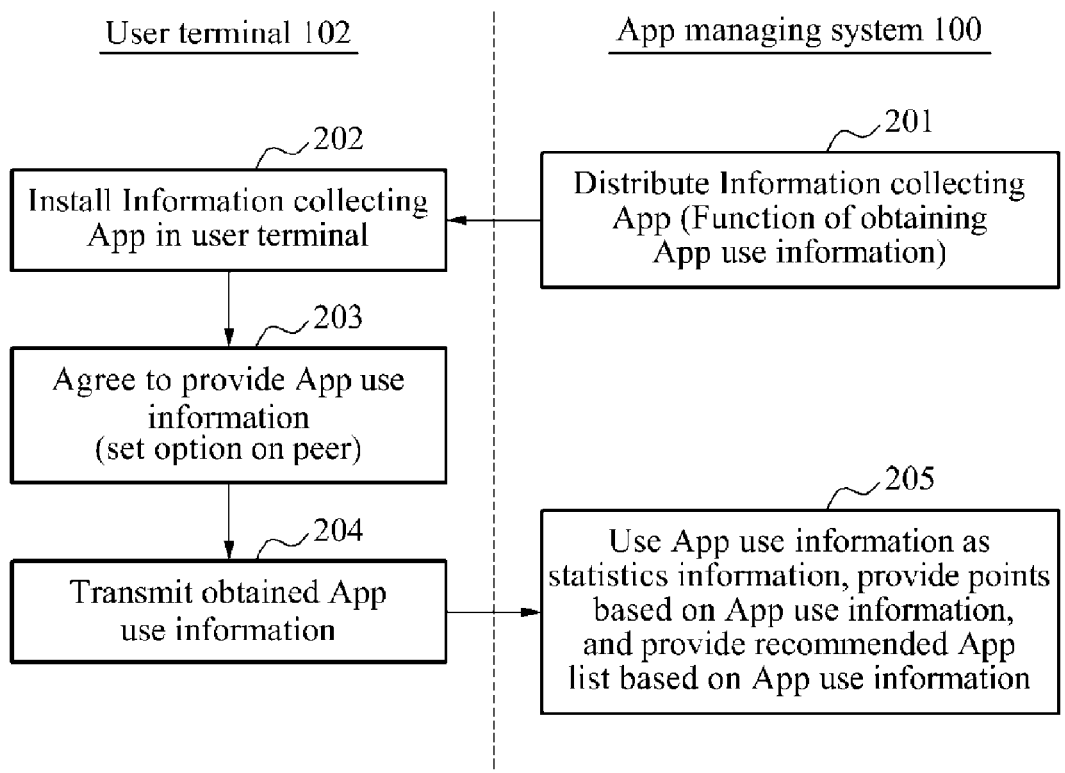

In the present exemplary embodiment, the App managing system 100 may provide the recommended App list to a user actually using the App, according to a recommendation logic that is internally embodied, based on various features, hereinafter referred to as 'use information' obtainable from the user terminal 102. Referring to FIG. 2, in operation 201, the App managing system 100 may also provide an application, hereinafter referred to as an 'information collecting App' that includes a function of collecting, from the user terminal 102, actual use information of the App installed in the user terminal 102. Here, the information collecting App may be configured to be in combination with an App recommending application to provide the recommended App list, or configured to be a separate App from the App recommending App. During operation 202 of downloading and installing the information collecting App in the user terminal 102 by the user, when the user agrees to provide the use information of the App to the App managing system 100, that is a host system in operation 203, the information collecting App may automatically collect the use information of the App and transmit the collected use information to the App managing system 100 in operation 204. Here, the user may set an option of agreeing to provide to a peer the use information of the App for the each App installed in the user terminal 102.

Subsequently, in operation 205, the App managing system 100 may determine the recommended App list based on statistics of App use by actual users by collecting the use information of the App from the plurality of user terminals 102 in which the information collecting App is installed. Further, the App managing system 100 may determine an App list used a great number of times by peers based on the actual use information of the App by the peers as the recommended App list to be provided to the user. Here, the recommended App list determined based on the use information of the App collected from the user terminal 102 may be provided by the information collecting App or a separate application, or on various platforms. Additionally, the App managing system 100 may utilize the use information of the App collected from the user terminal 102 as statistics information for analyzing a use pattern and a statistics report of an App, or may provide points to the user based on the use information of the App collected from the user terminal 102.

Hereinafter, the process of an information collecting App will be further described with reference to FIG. 3.

Figure 3:
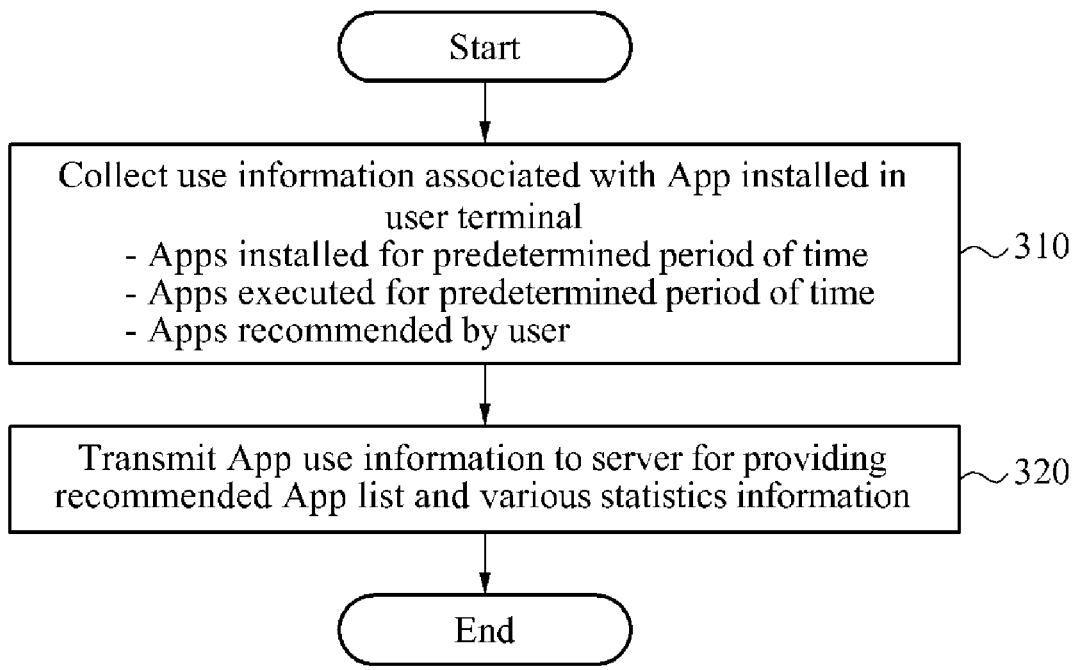
FIG. 3 is a flowchart illustrating a process of a program for collecting use information of an application in a user terminal and transmitting the collected use information to a server according to an exemplary embodiment of the present invention

FIG. 3 is a flowchart illustrating a process of an information collecting App for collecting actual use information of an application installed in a user terminal and transmitting the collected use information to a server according to an exemplary embodiment of the present invention. The information collecting App may include an information collecting code to collect the use information of the App, and an information transmitting code to transmit the use information of the App to the server.

In operation 310, the user terminal may function to collect the use information of the App in the user terminal using the information collecting code of the information collecting App.

In the present exemplary embodiment, use information of an App is as follows.

(1) Use information indicating that an App is newly installed by downloading or updating in a user terminal for a predetermined recent period of time (2) Use information indicating that an App is executed in a user terminal for a predetermined recent period of time (3) Use information indicating that an App is recommended by a user of a user terminal for a predetermined recent period of time The use information (1) of the aforementioned use information of the App may be used as a determining factor to determine a recommended App list by ascertaining a number of instances in which users install an App in the user terminal for a predetermined recent period of time, for example, one day. In addition, the use information (2) of the aforementioned use information of the App may be used as a determining factor to determine a recommended App list by ascertaining a number of instances in which users execute an App in the user terminal for a predetermined recent period of time. Also, the use information (3) of the aforementioned use information of the App may be used as a determining factor to determine a recommended App list by ascertaining a number of instances in which an App is recommended by users for a predetermined recent period of time. Further, the information collecting App may collect use information indicating a position of an icon of an App on a wallpaper of a user terminal. In this respect, the information collecting App may be used as a determining factor to determine a recommended App list by ascertaining an accessibility regarding whether a user arranges an icon on a position easily accessible and thereby uses the icon.

The use information indicating the position of the icon of the App on the wallpaper may include a weight applied to the position at which the icon is arranged on the wallpaper. To this end, with regard to the wallpaper, that is, an application managing interface, the user terminal may have a position value such as a coordinate value. Considering the accessibility of the user, the user terminal may apply a weight to the wallpaper, according to the position value.

As an example, a weight applied to an icon arranged in an earlier front page may be relatively higher than a weight applied to an icon arranged in a later back page. As another example, when the wallpaper includes at least one page, a weight applied to an icon arranged earlier on a page may be relatively higher than an icon arranged later on a page between icons on a same page. As still another example, when the wallpaper includes at least one page in which the wallpaper is divided into a plurality of regions, based on an access environment set on the wallpaper, a weight applied to an icon arranged in a region with a high user accessibility may be relatively higher than a weight applied to an icon arranged in a region with a low user accessibility.

In the present exemplary embodiment, the information collecting App may be configured by further including a setting code to provide a function of setting an option of agreeing to provide information with respect to the each use information (1) to (3) according to a request of a user, and a function of setting an option of agreeing to provide information with respect to each personal information of gender, location of residence, and age according to a request of a user. Here, the setting code may set the option of agreeing to provide the information for each App with respect to App use information according to the request of the user. A user terminal may receive an input of the option of agreeing to provide the information with respect to the each App use information and the personal information by the setting code of the information collecting App and thus, set the option. Accordingly, an information collecting code of the information collecting App may selectively collect information applicable for collection with respect to the App use information and the personal information in which the option of agreeing to provide the information is set. Also, the setting code of the information collecting App may provide a function of setting an option of agreeing to share information with other users with respect to the App use information for the each App according to the request of the user. Here, the setting code may set the option of agreeing to share the information with all users having a relationship with the user with respect to the App use information, or when the all users having the relationship with the user are divided into groups, set the option of agreeing to share the information with a specific group. In other words, the setting code may set an option to provide the App use information of the user to peers opted in for all categories, or provide the App use information of the user to the peers opted in for each category, among the peers having a relationship with the user. Thus, the information collecting code of the information collecting App may selectively collect the App use information applicable for collection with respect to the App in which the option of agreeing to share the information with the all users is set.

In operation 320, the user terminal may transmit the use information of the App collected in operation 310 to the server, that is, a host system, via the information transmitting code of the information collecting App. The collected use information (1) to (3) may be transmitted at predetermined intervals, or may be transmitted when there is a change in the use information of a previous interval. Here, an App managing system may provide a variety of additional services based on the use information of the App including at least one of the aforementioned use information (1) to (3) that is collected from the user terminal. Here, points provided by the App managing system may be used as a criterion for determining a member ranking of a user, or converted to a purchase voucher of an App for free downloading of the App. As another example, the App managing system may determine a recommended App list based on App use information including at least one of the use information (1) to (3). As still another example, the App managing system may provide a real-time feed or an activity to the user when a new App use information is collected from peers for whom an option of agreeing to share information with the user is set, such as in downloading a new App, recommending an App, and the like. Accordingly, the information collecting App may be configured by further including a receiving code to provide a function of receiving from the App managing system the App use information collected from the peers for whom the option of agreeing to share the information is set. Here, the receiving code may receive the App use information of a peer, provided in a form of a real-time feed or an activity and output the App use information of the peer in such forms of voice, message, alarm, and the like, that the user may check. The App managing system may provide the points to the user, or may consider the use information indicating a position of an icon on a wallpaper along with the use information (1) to (3) during a process of configuring the recommended App list.

Although a configuration of a user terminal to provide use information of an App that a user actually uses via an information collecting App is not shown, the user terminal may include a memory, more than one processor, and a plurality of programs. Here, the plurality of programs may be configured to be stored in the memory and implemented by the more than one processors, and may include at least one App and an information collecting App to collect the actual use information of the App. In addition, the user terminal may include a communication module to permit a communication with an App managing system, that is, a server system by supporting a varying communication protocol such as a code division multiple access (CDMA), a wideband code division multiple access (WCDMA), a long term evolution (LTE), a wireless fidelity (Wi-Fi), a Bluetooth, and the like.

Hereinafter, an internal configuration of an App managing system for providing a variety of additional services based on App use information of actual users will further be described with reference to FIG. 4.

Figure 4:
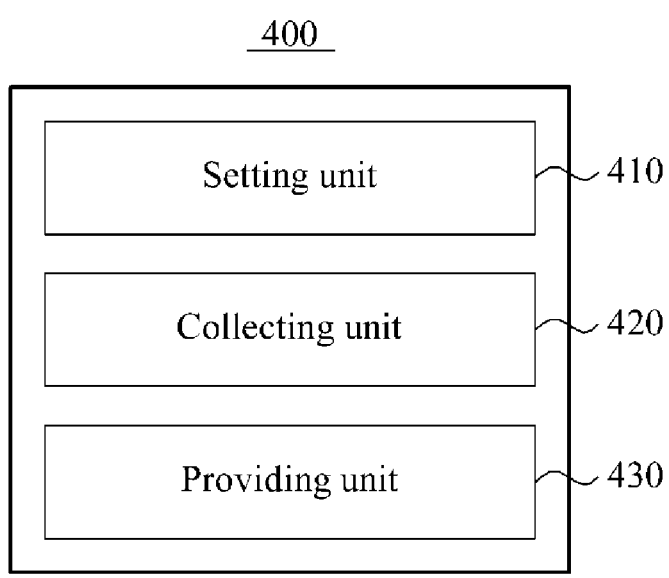
FIG. 4 is a block diagram illustrating an internal configuration of a server for providing a variety of additional services based on statistics of actual use of an application in a user terminal by users according to an exemplary embodiment of the present invention.

FIG. 4 is a block diagram illustrating an internal configuration of the App managing system for providing a variety of additional services based on statistics of actual use of an application in a user terminal by users according to an exemplary embodiment of the present invention. As shown in FIG. 4, the App managing system 400 may include a setting unit 410, a collecting unit 420, and a providing unit 430 according to an exemplary embodiment.

The setting unit 410 may set an option of agreeing to provide information with respect to App use information and personal information of a user by synching with an information collecting App on a user terminal according to a request of the user. The setting unit 410 may set the option of agreeing to provide the information in conjunction with a setting code of the information collecting App with respect to (1) use information indicating that an App is newly installed by downloading or updating in a user terminal for a predetermined recent period of time, (2) use information indicating that an App is executed in a user terminal for a predetermined recent period of time, and (3) use information indicating an App that is recommended by a user of a user terminal for a predetermined recent period of time. Here, the user may agree to collectively provide information with respect to all of the use information (1) to (3), or agree respectively to provide information with respect to each of the use information (1) to (3). In addition, the setting unit 410 may respectively set the option of agreeing to provide the information with respect to the App use information for the each App installed in the user terminal. Further, the setting unit 410 may set the option of agreeing to provide the information with respect to the each personal information including gender, location of residence, and age of the user in conjunction with the setting code of the information collecting App. Also, the setting unit 410 may set an option of agreeing to share information with other users with respect to the App use information for the each App in conjunction with the setting code of the information collecting App. Here, the setting unit 410 may set the option of agreeing to share the information with all users having a relationship with the user, that is, peers selecting an option of all categories, with respect to the App use information according to a request of the user, or when the all users having the relationship with the user are divided into groups, set the option of agreeing to share the information with a specific group, that is, peers selecting an option of specific categories, with respect to the App use information.

The collecting unit 420 may function to collect App use information of a user by synching with the information collecting App in a user terminal. The collecting unit 420 may receive actual use information of an App in the user terminal from the user terminal and collect the received actual use information in conjunction with the information collecting App. The collecting unit 420 may collect at least one of (1) use information indicating an App that is newly installed by downloading or updating in a user terminal for a predetermined recent period of time, (2) use information indicating an App that is executed in a user terminal for a predetermined recent period of time, (3) use information indicating an App that is recommended by a user for a predetermined recent period of time. Here, the collecting unit 420 may selectively collect information applicable for collection with respect to the App use information and the personal information for which the option of agreeing to provide the information is set. Also, the collecting unit 420 may selectively collect the App use information applicable for collection with respect to the App for which the option of agreeing to share the information with other users is set.

The providing unit 430 may provide a variety of additional services based on the App use information including at least one of the use information (1) to (3) collected from a user terminal by synching with the information collecting App in the user terminal and the personal information of the user.

As an example, the providing unit 430 may provide points to the user based on the App use information of the user collected from the user terminal. That is, the greater a number of times an App is downloaded by users, or the greater a number times the App is executed in the user terminal is, the more points the providing unit 430 may provide. As another example, the providing unit 430 may provide the points to the user based on a range of information for which the option of agreeing to provide the information is set by the user. In other words, the wider the range of information, that is, the greater an amount of information the user agrees to provide with respect to the use information (1) to (3) and the personal information of the user such as gender, location of residence, age, and the like, the more points the providing unit 430 may provide. In the present exemplary embodiment, the points may be used as a criterion for determining a member ranking of the user, or converted to a purchase voucher of an App for the App to be downloaded absent a fee. As an example, the user may download an App for free that may be originally set at a predetermined fee based on the points or the member ranking, or provided that a certain level is maintained, may receive benefits in a form of predetermined rewards, such as free downloads, once a week.

As an example, the providing unit 430 may utilize the App use information and the personal information of the user that the user agrees to provide and are collected from the user terminal, as statistics information for analyzing a use pattern and a statistics report of an App. The providing unit 430 may provide statistics of App use for the each user based on the App use information and the personal information of the user collected via the information collecting App, or function as a platform for providing the statistics information of the use pattern of the App to all users, for example, 'most popular App for females in their twenties'. That is, a thorough analysis of user information, a use pattern, a statistics report, and the like with respect to the App based on information agreed by users to be provided may be conducted so that an outcome of the analysis may be utilized as reference materials for marketing and future direction of development research.

As an example, the providing unit 430 may provide a recommended App list based on the App use information including at least one of the use information (1) to (3) collected from the user terminal. Here, the use information (1) to (3) may include a weight corresponding to each piece of information, and the recommended App list provided by the providing unit 430 may include an App of which the weight added up of the each weight of the use information (1) to (3) is greater than a predetermined value. The list of recommended applications provided by the providing unit 430 may include based on the use information (1) to (3) at least one of the first application that is installed by users installing the information collecting App a greater number of times than a predetermined number of installations, the first application that is executed by users executing the information collecting App a greater number of times than a predetermined number of executions, and the first application recommended by users recommending the information collecting App a greater number of times than a predetermined number of recommendations. Here, the providing unit 430 may provide the recommended App list by combining the use information (1) through (3), or selecting all or a piece of the use information (1) to (3). The providing unit 430 may provide the recommended App list based on the use information (1) to (3), via the information collecting App or a separate App, or on various platforms.

As an example, the providing unit 430 may determine a recommended App list based on App use information including at least one of the use information (1) to (3) collected from a user and peers for whom an option of agreeing to share information with each other is set. Here, the use information (1) to (3) may include a weight corresponding to the each use information (1) to (3), and the recommended App list provided by the providing unit 430 may include an App of which the weight added up of the each weight of the use information (1) to (3) is greater than a predetermined value. The recommended App list provided by the providing unit 430 may include based on the use information (1) to (3) at least one of an App that is installed by the peers agreeing to provide the App use information to the user a greater number of times than a predetermined number of installations, an App that is executed by the peers agreeing to provide the App use information to the user a greater number of times than a predetermined number of executions, and an App that is recommended by the peers agreeing to provide the App use information to the user a greater number of times than a predetermined number of recommendations. In other words, the providing unit 430 may embody various recommendation logics by considering aspects such as a number of times each App is downloaded by peers selecting an option of all categories, a number of times each App is executed by peers selecting an option of all categories, a number of times each App is recommended by peers selecting an option of all categories, a number of times each App is downloaded by peers selecting an option of each category, a number of times each App is executed by peers selecting an option of each category, a number of times each App is recommended by peers selecting an option of each category, and the like. That is, the providing unit 430 may provide a recommended App list that is appropriate and customized for a user, based on statistics of App use by the peers. The aforementioned providing unit 430 may provide the recommended App list determined based on the use information (1) to (3), via the information collecting App or a separate App, or on various platforms.

As an example, the providing unit 430 may provide a feed or an activity in real time to a user, when new App use information is collected from a peer among peers for whom an option of agreeing to share information with the user is set. That is, the providing unit 430 may provide App use information collected from the peer in the feed or the activity, similar to an instance in which a peer selecting an option of all categories newly downloads an App or recommends an App, or a peer selecting an option of a predetermined specific category newly downloads an App or recommends an App among peers having a relationship with the user. Thus, the user terminal may provide recent App use information by the peers to a user in a form of a voice, a message, an alarm, and the like, by receiving a real-time feed or activity transmitted from the providing unit 430 via the information collecting App.

Figure 5:
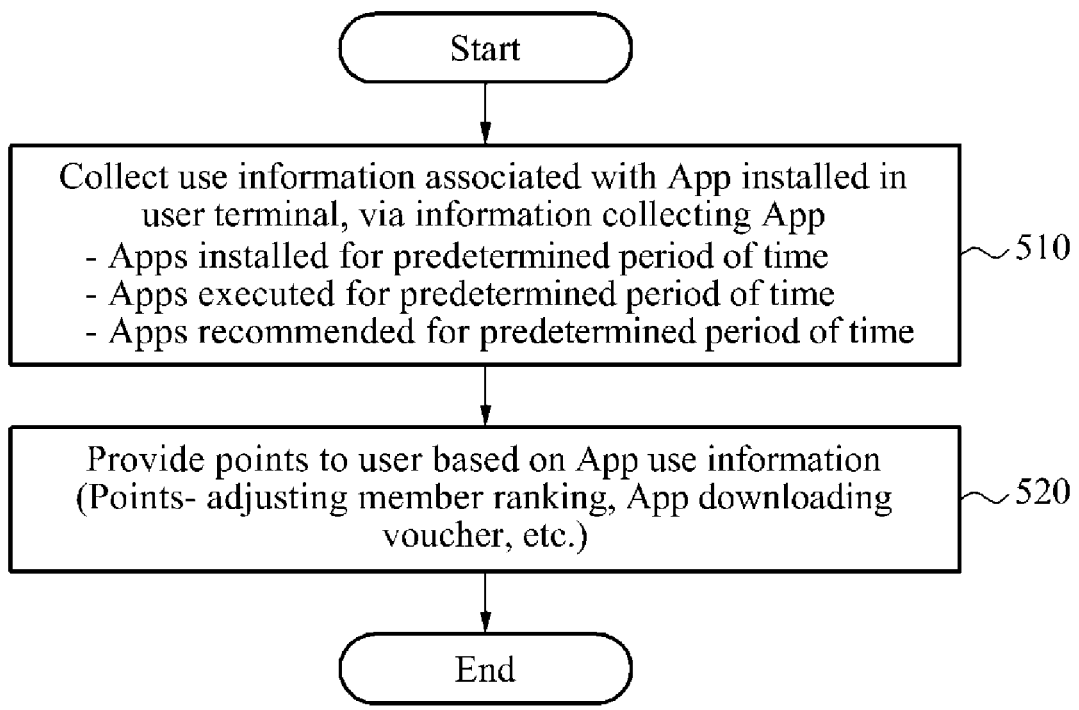
FIG. 5 is a flowchart illustrating a method of providing points based on a range of information in which an option of agreeing to provide information is set and actual use information of an application according to an exemplary embodiment of the present invention.

FIG. 5 is a flowchart illustrating a method of providing points based on a range of information in which an option of agreeing to provide information is set or based on actual use information of an App according to an exemplary embodiment of the present invention. Each operation of an App managing method according to the present exemplary embodiment may be performed by the App managing system 400 described in FIG. 4.

In operation 510, the App managing system 400 may collect the actual use information of a user with respect to an App installed in a user terminal by synching with an information collecting App in the user terminal. The App managing system 400 may collect the App use information including at least one of (1) use information indicating an App that is newly installed by downloading or updating in a user terminal for a predetermined recent period of time, (2) use information indicating an App that is executed in a user terminal for a predetermined recent period of time, (3) use information indicating an App that is recommended by a user for a predetermined recent period of time. In addition, the App managing system 400 may further collect personal information of a user such as gender, location of residence, age from users who install the information collecting App in the user terminal. Before the information collecting App collects the App use information and the personal information of the user from the user terminal in which the information collecting App is installed, the App managing system 400 may set an option of agreeing to provide information with respect to the use information (1) to (3) and the personal information of the user according to a request of the user. Here, the user may agree to collectively provide information with respect to all of the use information (1) to (3), or agree to individually provide information with respect to each of the use information (1) to (3). Moreover, the App managing system 400 may set the option of agreeing to provide the information with respect to the App use information for the each App installed in the user terminal. Therefore, the App managing system 400 may selectively collect information that may be collected with respect to the App use information and the personal information of the user in which the option of agreeing to provide the information is set.

In operation 520, the App managing system 400 may provide points to a user based on the App use information including at least one of the use information (1) to (3) collected from the user installing the information collecting App on the user terminal. Also, the App managing system 400 may provide the points to the user based on a range of information for which the option of agreeing to provide the information is set. That is, the greater a number of times an App is downloaded by users, the greater a number times an App is executed in the user terminal, or the wider the range of information for which the option of agreeing to provide the information, the more points the App managing system 400 may provide. Here, the points may be used as a criterion for determining a member ranking, or converted to a purchase voucher for an App to be downloaded absent a fee. That is, the App managing system 400 may adjust the member ranking of the user based on aggregated points, or may provide predetermined rewards such as the voucher for free downloading of an App for which a predetermined fee is originally set, and the like, based on the aggregated points of the user or the member ranking.

Further, the App managing system 400 may utilize the App use information and the personal information of the user that the user agrees to provide and are collected from the user terminal, as statistics information for analyzing a use pattern and a statistics report of an App. In other words, the App managing system 400 may provide statistics of App use for each user based on the App use information and the personal information of the user collected via the information collecting App, or provide the statistics information of the use pattern of the App with respect to all users.

Figure 6:
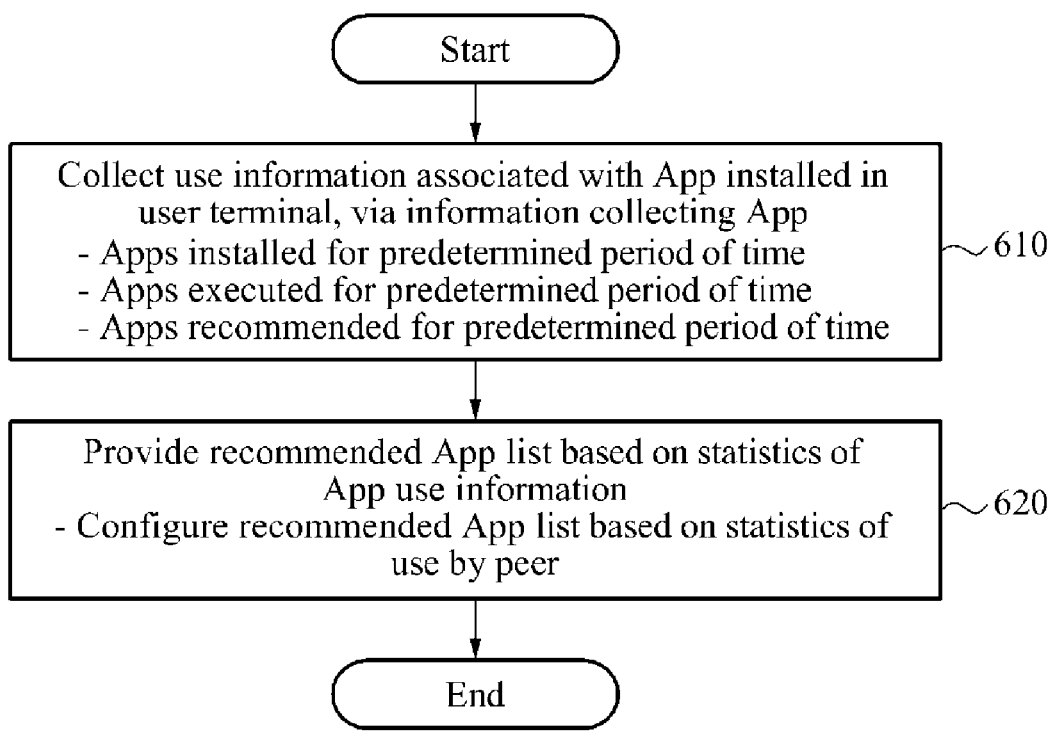
FIG. 6 is a flowchart illustrating a method of providing a list of recommended applications based on statistics of actual use of an application by users according to an exemplary embodiment of the present invention.

FIG. 6 is a flowchart illustrating an App managing method of providing a recommended App list based on statistics of actual use by users of an App in a user terminal according to an exemplary embodiment of the present invention. Each operation of the App managing method according to the present exemplary embodiment may be performed by the App managing system 400 described in FIG. 4.

In operation 610, the App managing system 400 may collect actual use information of a user with regard to an App installed in a user terminal by synching with an information collecting App in the user terminal. Here, the App managing system 400 may collect App use information including at least one of (1) use information indicating an App that is newly installed by downloading or updating in a user terminal for a predetermined recent period of time, (2) use information indicating an App that is executed in a user terminal for a predetermined recent period of time, (3) use information indicating an App that is recommended by a user for a predetermined recent period of time. Before the information collecting App collects the App use information from the user terminal in which the information collecting App is installed, the App managing system 400 may set an option of agreeing to provide information with respect to the use information (1) to (3) and personal information of the user according to a request of the user. Here, the user may agree to collectively provide information with respect to all of the use information (1) to (3), or agree to individually provide information with respect to each of the use information (1) to (3). In addition, the App managing system 400 may set the option of agreeing to provide the information with respect to the App use information for the each App installed in the user terminal. In this respect, the App managing system 400 may selectively collect information that may be collected from the App use information for which the option of agreeing to provide the information is set. Further, the App managing system 400 may set an option of agreeing to share information with other users with respect to the App use information for the each App installed in the user terminal. Here, the App managing system 400 may set the option of agreeing to share the information with all users having a relationship with the user with respect to the App use information according to a request of the user, or when the all users are divided into groups, set the option of agreeing to share the information with the all users with respect to a specific group. Accordingly, the App managing system 400 may selectively collect the App use information that is applicable for collection with respect to the App in which the option of agreeing to share the information is set.

In operation 620, the App managing system 400 may provide a recommended App list based on App use information including at least one of the use information (1) to (3) collected from a user terminal. Here, the recommended App list provided by the App managing system 400 may include at least one of an App that is installed by users installing an information collecting App a greater number of times than a predetermined number of installations, an App that is executed by users executing an information collecting App a greater number of times than a predetermined number of executions, an App that is recommended by users recommending an information collecting App a greater number of times than a predetermined number of recommendations. Here, the App managing system 400 may provide the recommended App list by combining the use information (1) through (3), or selecting one or a portion of the use information (1) to (3). Accordingly, the App managing system 400 may provide the recommended App list based on statistics of App use by the users who install the information collecting App.

Further, in operation 620, the App managing system 400 may determine the recommended App list based on the App use information including at least one of the use information (1) to (3) collected from the user and peers for whom an option of agreeing to share information with each other is set. Here, the recommended App list provided by the App managing system 400 may include based on the use information (1) to (3) at least one of an App that is installed by users agreeing to provide the App use information to the user a greater number of times than a predetermined number of installations, an App that is executed by users agreeing to provide the App use information to the user a greater number of times than a predetermined number of executions, an App that is recommended by users agreeing to provide the App use information a greater number of times than a predetermined number of recommendations.

In other words, the App managing system 400 may embody various recommendation logics by considering aspects such as a number of times each App is downloaded by peers selecting an option of all categories, a number of times each App is executed by peers selecting an option of all categories, a number of times each App is recommended by peers selecting an option of all categories, a number of times each App is downloaded by peers selecting an option of each category, a number of times each App is executed by peers selecting an option of each category, a number of times each App is recommended by peers selecting an option of each category, and the like. Thus, the App managing system 400 may provide a recommended App list that is appropriate and customized for a user, based on statistics of App use by the peers.

Further, the App managing system 400 may provide in real time a feed or an activity to a user when new App use information is collected from a peer with respect to the peers for whom the option of agreeing to share the information with the user is set. In other words, the App managing system 400 may provide the App use information recently collected from a peer in a form of the feed or the activity to the user, similar to an instance in which a peer selecting an option of all categories newly downloads an App, or a peer selecting an option of a predetermined, specific category newly downloads an App among the peers having a relationship with the user.

According to an exemplary embodiment, therefore, by providing points based on a range or piece of information provided by a user, and a number of times an App is downloaded an executed, and by providing sufficient rewards such as free downloading of an App based on the points, active service participation and consistent use of the App may be encouraged for the user. Consequently, an App developing company is enabled to promote Apps at low cost, and a thorough analysis of user information, a use pattern, and a statistics report with respect to an App based on information agreed by users to be provided may be conducted so that an outcome of the analysis may be utilized as reference materials for marketing and future direction of development research. Also, when exposed to a downloadable App at a predetermined fee, an App may be sold at a lower fee than an original price through conducting negotiations with a platform provider. Further, the platform provider may embody a business model in which an App platform provides statistics providing service associated with actual App use, from which profits may be guaranteed. Also, positioning as an essential App to a user is made possible through providing points based on a performance in App use. Moreover, according to the present exemplary embodiment, an application appropriate for the user may be recommended based on varied information obtainable from a user terminal of the user actually using the application. Also, according to the present exemplary embodiment, a more customized application may be recommended to the user by recommending an application being used a great number of times by peers based on actual use of the peers with respect to the application.

The exemplary embodiments according to the present invention may be recorded in computer-readable media including program instructions to implement various operations embodied by a computer. In particular, the present exemplary embodiment may be recorded in computer-readable media storing a program including a setting code to set an option of agreeing to provide information; an information collecting code to selectively collect App use information in which an option of agreeing to provide information; an information transmitting code to transmit the collected App use information to the App managing system, that is, a host system; and a receiving code to receive the App use information collected from a peer having a relationship with the user from the App managing system, with respect to (1) use information indicating an App newly installed by downloading or updating in a user terminal for a predetermined recent period of time, (2) use information indicating an App executed in a user terminal for a predetermined recent period of time, and (3) use information indicating an App recommended by a user for a predetermined recent period of time according to a request of the user. Here, the App use information collected from the user may be used as at least one of a criterion for providing points to the user, a criterion for determining a list of recommended applications, and statistics information associated with the App. The points provided based on the App use information of the user are used as a criterion for determining a member ranking of the user, or converted to a purchase voucher of the first application. The recommended App list determined based on the App use information may include at least one of an App that is installed by users installing an information collecting App a greater number of times than a predetermined number of installations, an App that is executed by users executing an information collecting App a greater number of times than a predetermined number of executions, and an App that is recommended by users recommending an information collecting App a greater number of times than a predetermined number of recommendations. Also, the recommended App list may be determined based on the App use information of peers agreeing to provide information to the user. In this instance, the recommended App list may include at least one of an App that is installed by peers a greater number of times than a predetermined number of installations, an App that is executed by peers a greater number of times than a predetermined number of executions, and an App that is recommended by peers a greater number of times than a predetermined number of recommendations.

A program according to the exemplary embodiments of the present invention may include a PC-based program or an application dedicated to a mobile device, for example, in a form of a smart phone application, a feature phone virtual machine (VM), and the like. The program may be configured to be stored in a memory of a user terminal and/or the App managing system, and implemented by more than one processor operated in the user terminal and/or the App managing system.

The computer-readable media may also include, alone or in combination with the program instructions, data files, data structures, and the like. The media and program instructions may be those specially designed and constructed for the purposes of the present invention, or they may be of the kind well-known and available to those having skill in the computer software arts. Also, the aforementioned file systems may be recorded in the computer-readable media.

In an exemplary embodiment of the present invention, a communication terminal includes at least one first application and a second application for collecting use information associated with the first application. The second application collects at least one of (1) use information indicating the first application that is installed in the communication terminal for a predetermined period of time, (2) use information indicating the first application that is executed in the communication terminal for a predetermined period of time, and (3) use information indicating the first application that is recommended by a user of the communication terminal for a predetermined period of time. The second application also transmits the use information to a host system associated with the second application and receives points from the host system associated with the use information transmitted to the host system.

According to exemplary embodiments of the present invention, based on varied information obtainable from a user terminal by a user actually using an application, an application that is appropriate and customized for a user among applications on the Internet may be recommended.

According to exemplary embodiments of the present invention, based on actual use information of an application by peers, by recommending an application used a great number of times by the peers, a credibility of a user with regard to a recommended application may be increased.

According to exemplary embodiments of the present invention, by providing points based on a range or piece of information provided by a user, and a number of times an application is downloaded and executed, and then by providing sufficient rewards such as free downloading of an application based on the points, more active service participation and consistent use of the application may be encouraged for a user.

According to exemplary embodiments of the present invention, a thorough analysis of user information, a use pattern, a statistics report, and the like with respect to an application based on information agreed by users to be provided may be conducted so that an outcome of the analysis may be utilized as reference materials for marketing and future direction of development research. The present invention is set forth by the limited exemplary embodiments and drawings herein, however, is neither limited thereto nor restricted thereby. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A server comprising:
    a storage device that stores a program;
    a processor that is configured to execute the program so as to cause the server to perform a method including the steps of:
        collecting, by a collecting unit stored at least in part on the storage device, from a communication terminal comprising at least one first application and a second application which is configured to collect use information associated with the first application in conjunction with the second application, use information collected from a user associated with the first application;
        providing, by a providing unit, a list of recommended applications based on statistics of the use information with regard to the first application, and
        causing a display of the communication terminal to notify the user of the list of recommended applications,
    wherein the use information comprises use information indicating that the first application is recommended by the user for a predetermined period of time,
    wherein the method further includes setting, by a setting unit, an option of agreeing to provide information with respect to the collected use information and personal information comprising at least one of gender, location of residence, and age of the user according to a request of the user, said setting unit being further configured to individually set the option of agreeing to provide each category of the use information,
    wherein the collecting selectively collects the use information and the personal information for which the option of agreeing to provide the information is set from the communication terminal in which the second application is installed, and
    wherein the use information and the personal information in which the option of agreeing to provide information is set are utilized for statistics information associated with the first application.

2. The server of claim 1, wherein the list of recommended applications provided by the providing unit comprises at least one of a first application that is installed by users installing the second application a greater number of times than a predetermined number of installations, a first application that is executed by users executing the second application a greater number of times than a predetermined number of executions, and the first application recommended by users a greater number of times than a predetermined number of recommendations.

3. The server of claim 2, wherein each use information of each of the first applications has a weight, and wherein each of the first applications included in the list of recommended applications has a total value of the weight that is greater than a predetermined value.

4. The server of claim 1, wherein the providing provides a reward based on a range of information for which the option of agreeing to provide information is set, and
    the reward is used as a criterion for determining a member ranking of the user, or converted to a purchase voucher of the first application.

5. The server of claim 1, wherein the method further including:
    setting, by a setting unit, an option of agreeing to share information with other users with respect to the use information for the each first application installed in the communication terminal, according to a request of the user, wherein the collecting collects the use information from the first application in which the option of agreeing to share the information with the other users is set.

6. The server of claim 5, wherein the setting sets an option of agreeing to share the information with all users having a relationship with the user, or when the all users having a relationship with the user are divided into groups, sets an option of agreeing to share the information with a specific group.

7. The server of claim 5, wherein the list of recommended applications provided by the providing unit comprises at least one of the first application that is installed by users setting an option of agreeing to share the information with the user a greater number of times than a predetermined number of installations, the first application that is executed by users setting an option of agreeing to share the information with the user a greater number of times than a predetermined number of executions, and the first application recommended by users setting an option of agreeing to share the information with the user a greater number of times than a predetermined number of recommendations.

8. The server of claim 5, wherein the providing provides the user with the use information in real time, when the use information collected from users setting an option of agreeing to share the information with the user.

* * * * *